United States Patent

[11] 3,591,787

[72] Inventors Charles V. Freiman
Los Altos;
Chung Chian Wang, Stanford, both of, Calif.

[21] Appl. No. 701,267
[22] Filed Jan. 29, 1968
[45] Patented July 6, 1971
[73] Assignee International Business Machines Corporation
Armonk, N.Y.

[54] DIVISION SYSTEM AND METHOD
9 Claims, 2 Drawing Figs.

[52] U.S. Cl. .......... 235/164, 235/156
[51] Int. Cl. .......... G06f 7/39, G06f 7/38
[50] Field of Search .......... 235/164, 156

[56] References Cited

UNITED STATES PATENTS

| | | | |
|---|---|---|---|
| 3,023,961 | 3/1962 | Stafford | 235/164 |
| 3,223,831 | 12/1965 | Holleran | 235/164 |
| 3,234,367 | 2/1966 | Ottaway et al. | 235/164 X |
| 3,319,057 | 5/1967 | Githens et al. | 235/164 |
| 3,378,677 | 4/1968 | Waldecker et al. | 235/164 |

OTHER REFERENCES

IBM TECHICAL DISCLOSURE BULLETIN, " High-Speed Division Algorithum," D. N. Senzig, Vol. 10 No. 5, October 1967

*Primary Examiner*—Malcolm A. Morrison
*Assistant Examiner*—James F. Gottman
*Attorney*—Fraser and Bogucki ABSTRACT: A system and method for digital division employing a composite of table lookup and iteration techniques. A stored logic table is used which generates a factor M which when multiplied against the divisor, provides a new divisor in a predetermined range close to unity in value. Both the divisor and the dividend are then multiplied by the factor M, the capacity of the table lookup determining the maximum difference of the new divisor from unity. The arrangement is such that, depending upon the difference between the new divisor and unity, a selected number of new partial quotient digits is directly determined from a selected number of digits in newly generated partial remainders. By generating quotient digits in successive groups, only a few iterations are needed to divide one long number by another. Successive division steps entail merely the generation of new partial products, and derivation of the difference of these partial products from the previous partial remainder. By arranging the significant portion of the new divisor to be a negative quantity in a preferred form of system, only adder circuits need by employed. A high speed, high capacity binary digital division system utilizing these techniques is further arranged to utilize carry-save adder circuits to utilize carry and sum quantities without introducing carry propagation delays, and otherwise minimize operating cycle time.

INVENTORS
CHARLES V. FREIMAN
CHUNG CHIAN WANG

BY Fraser and Bogucki

ATTORNEYS

INVENTORS
CHARLES V. FREIMAN
CHUNG CHIAN WANG
BY
Fraser and Bogucki
ATTORNEYS

DIVISION SYSTEM AND METHOD

BACKGROUND OF THE INVENTION

1. Field of the Invention

This invention relates to digital data processing systems, and more particularly to digital division systems and methods.

2. Description of the Prior Art

Many different division techniques have been formulated for digital data processors because division is generally a particularly lengthy and cumbersome arithmetic operation. One of the first attempts at simplifying and speeding the division operation was based upon generation of the reciprocal of the divisor, after which straightforward multiplication could be used. Depending upon the value whose reciprocal is to be found, however, the word length or format of a system may not be sufficient to develop the reciprocal with necessary precision. Thus an alternative method of division must generally be available in any event. Consequently, the shortcomings of this approach have limited its extent of use.

Two principal approaches have been followed in attempting to facilitate division operations. One technique is roughly comparable to longhand division, and is generally referred to as nonrestoring division. In this division technique, the product of a quotient digit and the divisor is first compared to the dividend, and if the proper quotient digit has been selected, the product of the multiplication is subtracted from the remainder to form a new remainder. New quotient digits are selectively and successively chosen, each being multiplied against the divisor and the partial product subtracted to provide progressively smaller remainders until the final quotient is reached. In what is commonly known as the remainderless division method, on the other hand, iterative development of quotient digits is not employed, but instead a common multiplicative factor is chosen for multiplication against both the numerator and denominator, to cause the new denominator to approach unity. In this method, the multiplicative factor is determined from the old denominator, utilizing table lookup for the first iteration and relatively simpler decoding rules for subsequent iterations.

Both of the above techniques have certain inherent limitations when condition are encountered in which increased speed and capability are required. For the extremely high capacity, high speed digital computing systems of the future, for example, rapid execution of division commands is one prime requirement. The use of large amounts of circuitry is necessarily assumed and can be tolerated if justified by resultant increases in performance. As size, speed and capacity are increased, excessive problems are encountered with the nonrestoring division technique, because of the extremely wide range of choices that must be encompassed at each successive iteration. The remainderless division techniques also have certain inherent speed limitations, because of the necessity for full multiplication and subtraction of each iteration. More importantly, these techniques under certain conditions develop ambiguous values and require additional operational sequences, and therefore additional time, to ascertain the sign of the remainder.

SUMMARY OF THE INVENTION

An improved high speed, high capacity division system in accordance with the invention utilizes a combination of table lookup and nonrestoring division techniques, with the value of the divisor being employed to generate a multiplicative factor M which establishes a new divisor having a value in a predetermined range approximating unity. The degree of approximation of the new divisor to unity is dependent upon the capacity of the table lookup system, and determinative of the number of subsequent iterations needed. The dividend is also multiplied by the factor M, to provide an initial full remainder. A characteristic of the system is that a given number of high order digits of the initial full remainder and subsequent partial remainders comprise partial quotient values. Partial products, derived by multiplication of the partial quotients and the new divisor, are subtracted from the remainder values to provide the next remainder. Successive iterations successively reduce the remainder by corresponding groups of digits until the quotient is developed to the needed precision. The partial quotients may be accumulated separately and ultimately combined, or combined cumulatively.

Specific arrangements in accordance with the invention provide substantial advantages in speed of operation for digital data processing systems. A new small divisor value may be generated as a negative quantity representing the difference between the new divisor and unity and having a predetermined number of high order digits equal to zero. This predetermined number controls the number of iterations needed for division of numbers arranged in particular word lengths.

Further in accordance with the invention, particularly high-speed arrangements are shown for developing successive quotient groupings and partial remainders. Remainders are held in carry-save form, being applied together with partial products to a carry-save adder system. The partial products are generated without carry propagation delay by decoding carry and sum values to control multiplication directly. A quotient decoder responsive to the remainder carry and sum values controls multiplication by determining whether a binary multiplicand is to be added with or without shift in response to successive digital places in a binary multiplier.

Systems in accordance with the invention may be utilized with binary, decimal and other number systems. Methods in accordance with the invention provide relatively simplified division techniques without necessitating complicated selection procedures for the successive quotient digits. Selection of optimum size and speed relationships for a given application can be facilitated through control of the selection of the common multiplicative factor M in the first step of the composite process.

BRIEF DESCRIPTION OF THE DRAWINGS

The foregoing and other objects, features and advantages will be apparent from the following more particular description of a preferred embodiment of the invention, as illustrated by the accompanying drawings.

DETAILED DESCRIPTION OF THE INVENTION

Figure 1:
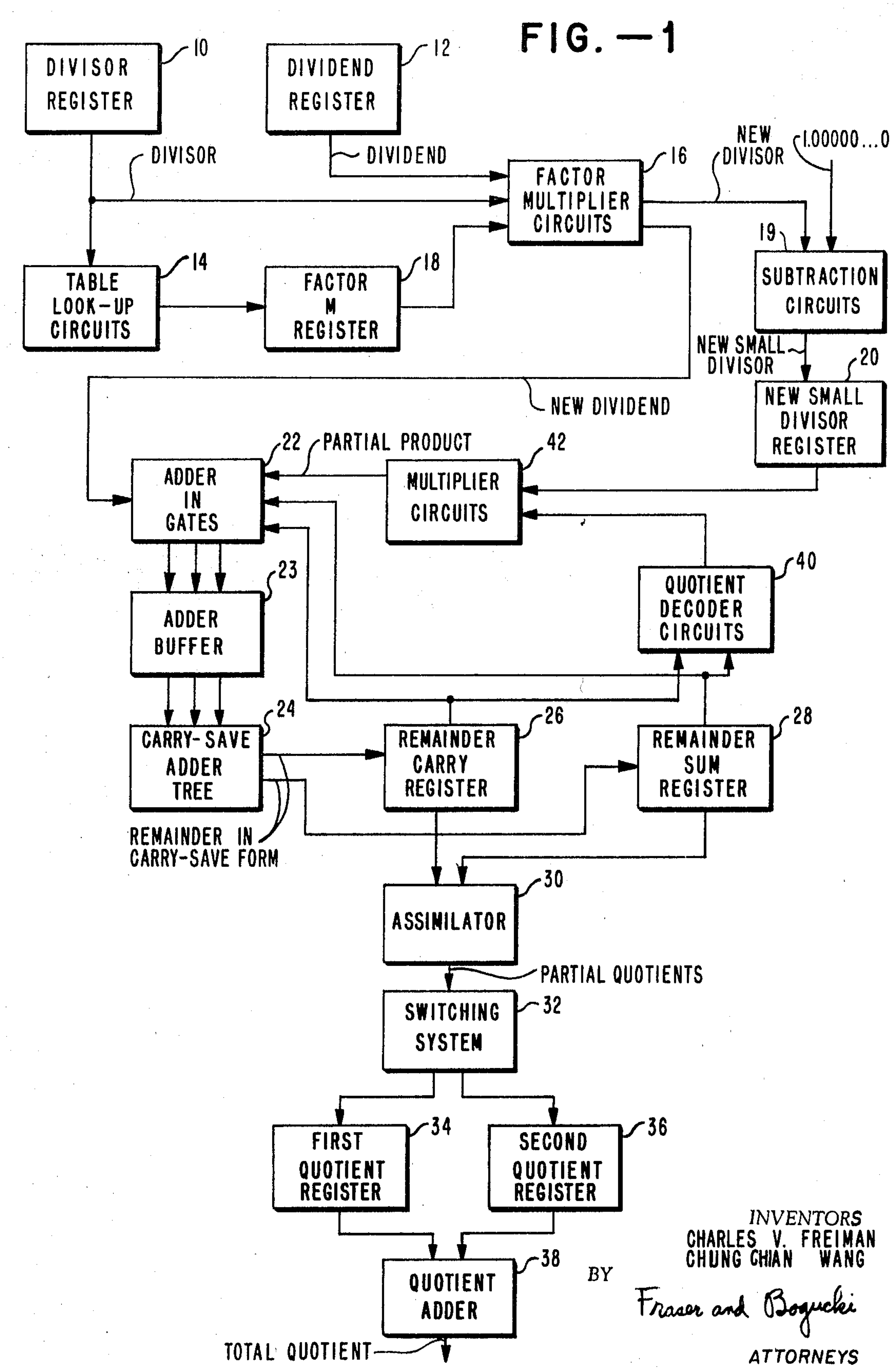
FIG. 1 is a block diagram of an example of a digital division system in accordance with the invention.

The system of FIG. 1, to which reference is now made, is illustrative of that portion of a digital computing system specifically devoted to carrying out a division operation. Although a number of the principal functional units shown in FIG. 1 may also be employed for other purposes at other times, such functions have been omitted herein for brevity and in order to simplify the description. For similar reasons, coaction of this portion of the system with the remainder of the digital computing system, as in the generation and use of timing and control signals, has been omitted. It is largely immaterial to the functioning of systems in accordance with the invention, for example, whether they are operated in a synchronous or asynchronous mode or arranged in accordance with some particular form of system organization. It will also be recognized by those skilled in the art that the signal flow paths between various functional units in the system correspond to parallel lines determined in number by the coding formats and word lengths employed. Examples of division systems illustrative of the present state of the art are to be found in Pat. Ser. No. 3,145,296, and in pending applications Ser. No. 576,157, filed Aug. 30, 1966 by R. E. Goldschmidt et al. and Ser. No. 576,401, filed Aug. 31, 1966 by R. E. Goldschmidt et al. and both assigned to the assignee of the present invention.

In FIG. 1, the accompanying digital computing or processing system (not shown) provides a divisor value to a divisor register 10 and a dividend value to a dividend register 12, each of these storing the digits in parallel and presenting the respective quantities in signal form for used by associated circuits. The present example is concerned with an extremely high speed, high capacity digital computing system, of general purpose character but specifically intended for large scale scientific and other data processing operations. Consequently, it may be assumed that the divisor and dividend values may use extremely long word lengths, such as 48 binary digits.

The output terminals of the divisor register 10 are coupled to table lookup circuits 14 and factor multiplier circuits 16. The table lookup circuits 14 may comprise any conventional form of logical networks, such as diode matrices, extended to the desired total capacity. Alternatively, they may comprise a core storage-type of table lookup, such as is disclosed in U.S. Pat. No. 3,028,086. In this latter type of system, for example, logical networks may be employed in combination with binary input signal combinations to generate activating signals on two addressing conductors within a large (e.g. 10,000 or more core element) random access memory. Output conductors threaded through the core elements in selectively varying fashion provide a readout signal only for that particular core element corresponding to a desired output value. This one-out-of-a-number code value is then reconverted in another logical network to a binary value representing a factor M. Although Pat. No. 3,028,086 deals specifically with generation of quotient values by a core matrix lookup system, and it will be appreciated that this is directly applicable to generation of a desired multiplicative value M.

In the present instance, however, it is preferred to employ a logical gating network for generating the factor M, inasmuch as modern technology based upon mass production and integrated circuit techniques permits large decision networks of high speed and reliability to be provided at relatively low cost.

The binary factor M selected for a particular division is stored in a register 18, and supplied along with the divisor and dividend values to the factor multiplier circuits 16. The factor M is selected with respect to the divisor value to provide a product, constituting the new divisor value, that approximates (or equals) unity in a selected range. Here the range covers values of unity to slightly less than unity. In typical examples given below the new divisor value is between seven-eighths and 1, and between fifteen-sixteenth and 1, that is, binary values of between 0.111...0 and 1.000.0. When used in the division system, the new divisor generates partial products which have at least a given number N, of highest order digits that are zeros. The value N is in effect determined by the degree of approximation to unity.

The product of the factor M and the divisor is entered through subtraction circuits 19 into a new small divisor register 20. Although the new divisor itself may be used, this single subtraction both shortens the multiplicative steps and permits the subsequent use of adder trees throughout the system. The subtraction circuit 19 provides the difference between the new divisor and 1, in the form 1-Y, the difference term (-Y) hereafter being referred to as the "new small divisor."

The remainder of the system may be regarded as the iteration portion, which receives the new dividend value provided by multiplying the dividend by the factor M in the factor multiplier circuit 16, as well as the new small divisor, and repeatedly cycles these and subsequent values in generating the full quotient.

The new dividend value is transferred once to an adder system comprising adder in gates 22, an adder buffer 23 and a carry-save adder tree 24. A number of lines are shown interconnecting the adder in gates 22 to the adder buffer 23 and the adder buffer 23 to the carry-save adder tree 24, inasmuch as different binary quantities are coupled at different times to the carry-save adder tree 24. The adder in gates 22 receive, at successive times described below in conjunction with the operation of this system, the new dividend value, partial product values and a part of partial remainder values. New remainder values are generated in carry-save form at the output terminals of the adder tree 24 and applied to a remainder carry register 26 and a remainder sum register 28 respectively.

In accordance with the invention, a predetermined portion of each new remainder is determinative of the next partial quotient. This predetermined portion comprises a selected number of high order digits in the remainder value, and these corresponding places from the carry register 26 and the sum register 28 are coupled to an assimilator 30, the output from which constitutes the partial quotient in assimilated form. The partial quotient values are then selectively diverted by a switching system 32 to predetermined positions in first and second quotient registers 34, 36 respectively. Although this function may also be supplied by enabling gates in the appropriate parts of the registers 34, 36, the switching action is more distinctly delineated as shown. Specifically, the successive partial quotients are alternatively switched by the switching system 32 to the first and second quotient registers 34, 36 into successive but overlapping digital positions. For example, if each partial quotient is four (or N) digits long the first partial quotient is entered in the first through fourth (1st to Nth) places and the second partial quotient is entered in the fourth through seventh (Nth to [2 N−1]) places, the third partial quotient is entered in the seventh through tenth ([2N−1]th to [3N−2]th) places, etc. The entire quotient is generated after all the partial quotients have been accumulated in a quotient adder 38, which provides as its output the desired result or total quotient.

The iteration arrangement also includes circuits for using the carry and sum quantities from the registers 26, 28 for multiplication without direct recombination or delay. The circuits are referred to herein as quotient decoder circuits 40, and are described in greater detail below in conjunction with FIG. 2. Although assimilator circuits may be employed for this same purpose, speed is of greater significance in the iteration sequences and it is preferred to employ what may be termed a ternary system for recombining in parallel those portions of the remainder value that constitute the new quotient value to be multiplied against the new small divisor. The quotient decoder circuits 40 receive a selected number of high order digits of the remainder, this more significant digit portion corresponding to the partial quotient.

The less significant digit portion of the remainder, consisting of the remainder less those digits selected for the quotient, are recirculated to the adder system at the adder in gates 22. The carry-save form is preserved to minimize delays.

The output of the quotient decoder circuits 40 is multiplied against the new small divisor in multiplier circuits 42 that provide the partial product values to the adder in gates 22. Further details are provided in conjunction with the example of FIG. 2 below.

In the operation of the system of FIG. 1, certain general steps in a method of multiplication are followed that will be given herein immediately below. It will be appreciated by those skilled in the art that various other expedients may be employed, to perform the multiplication, table lookup and addition functions. Immediately subsequent to the following general example, a specific illustration is given of the steps employed in division of one binary coded quantity by another.

TABLE LOOKUP

Composite division in accordance with the invention commences with generation of the factor M, by referencing the divisor value presented by the register 10 to the stored logic table retained in the table lookup circuits 14, and extraction of an appropriate factor M which, when multiplied, gives a product forming a new divisor in a selected range approximating unity. It is preferred that the range encompass values slightly less than unit, although a range greater than unity may also be used with appropriate modification of the circuits for developing the remainder. Choosing, by way of a specific but simplified example, a new divisor (1−Y) of between seven-eighths and 1, the new divisor may be expressed as:

$1-y=1-(0.0001)$

For reasons more fully appreciated in conjunction with the detailed example below, only the negative fractional portion of the new divisor, or the new small divisor need be stored. Consequently, when the divisor from the register 10 is multiplied by the factor M in the factor multiplier circuits 16, this negative quantity is generated by subtracting the new divisor from one (1) in the subtraction circuits 19. The new small divisor then stored in the register 20 is the sole value thereafter presented during the iteration sequences.

If the quantity stored in the register 20 is all zeros, as may happen at random, this of course signifies that the chosen factor M has made the new divisor precisely equal to unity. The product of M and the dividend, therefore itself constitutes the desired quotient and subsequent iterations are not needed. The all 0's condition of the register 20 may be sensed by an appropriate AND gate (not shown) and the new dividend value may be transferred out directly as the total quotient.

GENERATION OF NEW DIVIDEND

The dividend value presented by the register 12 is also multiplied by the factor M, to equalize the divisor and dividend. States in another way, both the numerator ($N_0$) and denominator ($R_0$) of the quantity involved are multiplied by the same factor M. The new dividend is also referred to herein as the new initial remainder, $R_0$. When the new divisor value differs from unity by a factor of less than one-eighth (i.e. the difference value is no greater than a binary value of 0.000111l....1), the three highest order digits of each new remainder constitute the first three digits of the next partial quotient, and this rule holds true as well for the first or initial remainder $R_0$. This predetermined number (N) of digits is given merely as an example, and it will be recognized that in large scale systems the number will be much larger. The new dividend or $R_0$ value is applied directly through the adder gates 22 and adder buffer 23 to the carry-save adder tree 24 without addition to any other quantity. The entire quantity is applied to the remainder carry register 26 and remainder sum register 28 (carries not being involved at this particular point in the operation) and then presented to the adder in gates 22 for the subsequent generation of a new remainder.

FIRST PARTIAL QUOTIENT

The predetermined group of most significant digits of the new full remainder $R_0$ are provided from the remainder carry register 26 and the remainder sum register 28 to the assimilator 30, where they are coupled from the switching system 32 to the first quotient register 34, in the positions corresponding to the first through third most significant positions in the quotient. Concurrently, the quotient equivalent is developed at high speed in the quotient decoder circuits 40, for the first three significant digits, and this equivalent is applied along with the new small divisor value to the multiplier circuits 42.

Thus the generation of one remainder automatically includes generation of a partial quotient, which is stored for subsequent use in development of the total quotient, and also used as the basis for generation of the partial product in the subsequent iteration.

GENERATION OF NEW PARTIAL REMAINDER

The first partial quotient is in effect multiplied against the new small divisor (−Y) in the multiplier circuits 42, and a first partial product is developed that is applied in parallel binary form to the adder in gates 22, and through the adder buffer 23 to the carry-save adder tree 24. This partial product is in effect negative, so that the absolute value of the quantity is used, and is simply added to the less significant digit portion of the new remainder $R_0$ in the carry-save adder tree 24. As is described in detail below, in conjunction with the specific example, the remainder is thus reduced, with at least the first three digital places cancelling, and a new partial remainder is provided to the remainder carry register 26 and remainder sum register 28. The first three digits of this remainder again serve as the next partial quotient, being combined in the assimilator 30, and switched by the switching system to the third through sixth places of the total quotient in the second quotient register.

DEVELOPMENT OF FULL QUOTIENT

The successively developed partial quotients accumulated in overlapping fashion in the first and second quotient registers 34 and 36, are maintained until all partial quotients have been generated. They are thereupon combined in the quotient adder 38 to provide the multidigit binary quotient as output from the system.

SPECIFIC EXAMPLES

The following example of a division sequence illustrates the operation of digital division systems and methods in accordance with the invention. Typical table lookup values (M) are illustrated by the following chart:

CHART I

| Divisor: | Multiple (M) chosen |
|---|---|
| .1000000 | 1. 1110 |
| .1000100 | 1. 1101 |
| .1000110 | 1. 1100 |
| .1001000 | 1. 1011 |
| .1001010 | 1. 1010 |
| .1001110 | 1. 1001 |
| .1010000 | 1. 1000 |
| .1010100 | 1. 0111 |
| .1011000 | 1. 0110 |
| .1011100 | 1. 0101 |
| .1100000 | 1. 0100 |
| .1100110 | 1. 0011 |
| .1101011 | 1. 0010 |
| .1110001 | 1. 0001 |
| .1111000 | 1. 0000 |

Assume the following products of M and the original dividend and divisor:

New dividend $=R_0=1.01011111$ (1)

New divisor $=1-.00010110=1-y=.0.11111010$ (2)

Thus when shown in a form comparable to longhand division the initial division step is as follows (for purposes of illustration the first partial remainder is presented in assimilated form):

```
1              1.01 (First partial quotient)
−0.00010110 | 1.01011111 (R₀)
            |−1.01
             +0.00010110
             +0.000000000
             +0.0000010110
              0.0011101010(First partial Remainder)
                                              (3)
```

It will be noted that with the divisor expressed as 1−Y, and with a small Y value, the first three remainder digits (1.01) are determinative of the first partial quotient and no quotient selection network or rule is required. If these digits were to be multiplied against 1, this portion of the partial product would always cancel, so that in fact only the Y value need be stored and manipulated. The value (−Y) being negative, the partial product of (−Y) and the first partial quotient may be added to form the first partial remainder. The three partial products are additively combined as derived.

The next step, and all succeeding steps, then follow the same pattern, as shown below. With groups of three digits being generated as partial quotients, the next partial quotient selected from the first partial remainder comprises the third through fifth most significant digits, or the value 0.0011 (the first two digits being equal to zero). This step is thus as shown immediately below for the present example:

$$
\begin{array}{rll}
 & 0.0011 & \text{(Second partial quotient)} \\
1 & 1.01 & \text{(First partial quotient)} \\
\hline
-0.00010110 \,| & 1.01011111 & (R_o) \\
 & -1.01 & \\
 & +0.00010110 & \\
 & +0.000000000 & \\
 & +0.0000010110 & \\
\hline
 & 0.0011101010 & \text{(First partial remainder)} \\
 & -0.0011 & \\
 & +0.0000000000 & \\
 & +0.00000010110 & \\
 & +0.000000010110 & \\
\hline
 & 0.000011101010 & \text{(Second partial remainder)}
\end{array} \qquad (4)
$$

We assume here for brevity that the quotient has been developed to the necessary accuracy, and the sum of the partial quotients, or 1.0111, may then be developed. The overlap between partial quotients is of course needed to account for possible carry values. The partial effectively quotient digit portion of each new remainder is separated from the less significant digit portion because the fractional (Y) divisor has sufficient leading zeros to ensure that there is no carry over into the quotient portion.

Subsequent steps are not shown inasmuch as they are merely repetitious. The above illustrates that in composite division in accordance with the invention development of the quotient is greatly facilitated and shortened by the initial generation of the common multiplicative factor M, followed by sequences of nonrestoring division.

QUOTIENT DECODER, FIG. 2

Figure 2:
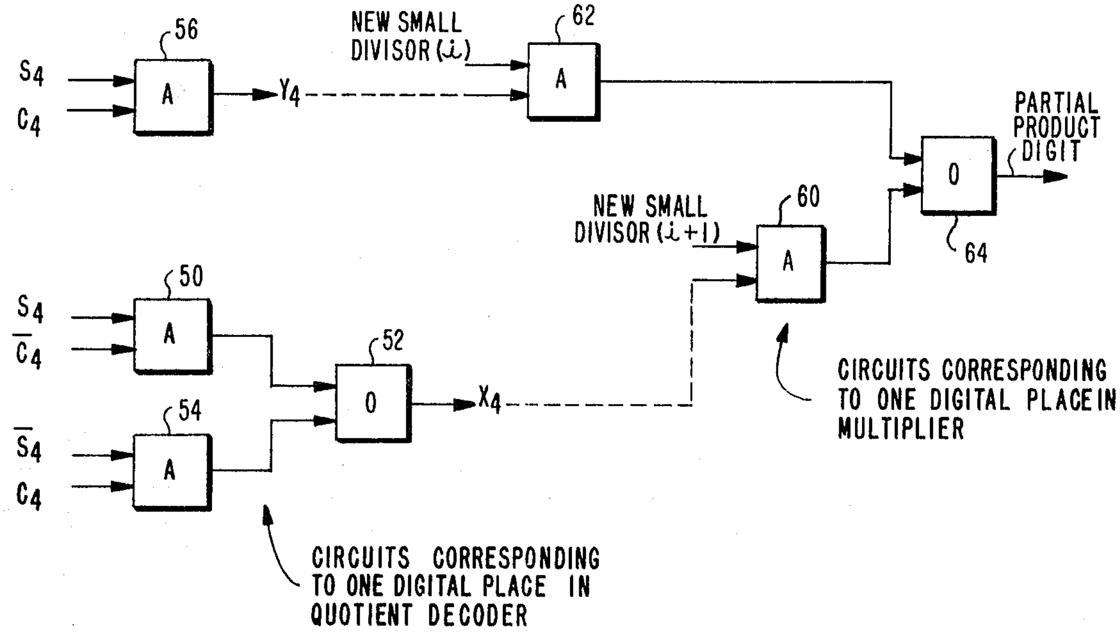
FIG. 2 is a block diagram of an illustrative portion of a quotient decoder circuit employed in systems in accordance with the invention.

The quotient decoder circuits 40 of FIG. 2 cooperate in the recirculation loop including the multiplier circuits 42 and the various adder circuits, by means of which new remainders are generated. Although as previously suggested the carry and sum terms derived from the adder trees could be combined by an assimilator into a single binary quantity, it is preferred to employ the particular form of decoding shown in FIG. 2, in conjunction with the overall arrangement of the multiplier and adder circuits.

The system is arranged such that the new small divisor constitutes the multiplicand, and the partial quotient constitutes the multiplier. It will be recognized by those skilled in the art that in the multiplication of two straightforward binary quantities, the multiplicand is selectively added, with appropriate shift, for each successive binary one digit in the multiplier. Such an arrangement is not feasible where the carry and sum portions of the multiplier are separate.

By utilizing quotient decoder circuits as exemplified in FIG. 2, however, in conjunction with the multiplier and adder circuit, the product of each partial quotient and the new small divisor is generated in minimum time and without carry propagation delays. It will be recognized that the diagram of FIG. 2 corresponds only to one digital place for multiplier and multiplicand, it being evident that extension to a number of digital places involves merely duplication of the circuitry shown.

In explaining the decoder system of FIG. 2 reference is made to the example previously given in conjunction with the initial division step, identified above as expression (3). The first partial remainder given therein is developed in carry-save form from the initial full remainder R as follows:

$$
\begin{array}{lll}
R_o & & \cdots 01111100 \\
\text{Partial} & \left\{ \begin{array}{l} \phantom{=}.00010110 \\ =.000000000 \\ \phantom{=}.0000010110 \end{array} \right. & \\
\text{Products} & & \\
\hline
\text{Sum} & =.0000110010 & \\
\text{Carry} & =.001011100 &
\end{array} \qquad (5)
$$

For ease of reference the five most significant digits in these sum and carry remainders may be designated as successive S and C digits, as follows:

$$
\begin{array}{l}
.S_1\,S_2\,S_3\,S_4\,S_5 \\
.0\;\,0\;\,0\;\,0\;\,1 \\
\hline
.C_1C_2C_3C_4C_5 \\
.0\;\,0\;\,1\;\,0\;\,1
\end{array} \qquad (6)
$$

In conjunction with the above expression (6) the terms X and Y may be used for corresponding digital places with the significance that the X term designates that partial product quantities are to be added *without* shift, and the Y term designates that quantities are to be added with a shift of one position. For each digital place, such as the sum and carry values represented as $S_4$ and $C_4$, corresponding shift control terms e.g. ($X_4$ and $Y_4$) are generated. FIG. 2 therefore exemplifies the logical network arrangement exemplifying these conditions, the digital values in the fourth digital place having been selected arbitrarily for purposes of illustration.

If both the sum and carry values are zero, of course, no partial product quantity is generated and the system merely shifts to the next multiplier digit. If the sum digit is a binary one and the carry digit is a binary zero ($S_4 \cdot \overline{C_4}$), the AND gate 50 is activated, energizing the OR gate 52 that generates the $X_4$ signal. Similarly the $X_4$ signal is also generated by the AND gate 54 and passed through the OR circuit 52 if the carry is present but the sum digit is zero ($\overline{S_4} \cdot C_4$). The $Y_4$ signal is generated when both sum and carry are present ($S_4 \cdot C_4$), by activation of the AND gate 56.

In the circuits, therefore, partial products are generated with or without a shift of one position, through use of the X and Y values. Taking the new small divisor digits in order of significance as $i$, $i+1$, etc. the fourth quotient digit causes the divisor to be added in without shift if the $X_4$ term is true. For one digital place in the multiplier, an AND gate 60 is activated by the $X_4$ term to provide the partial product digit. The next most significant divisor digit (N) is used and the partial product is effectively shifted one position by activation of the AND gate 62 when the $Y_4$ term is true. Output signals from both the AND gates 60 and 62 are passed through OR gates 64 as the partial product. These values are then accumulated in the carry-save adder tree 24 as they are generated in the multiplier. Shifting of the successive partial products and corresponding steps in the multiplication and accumulation of digital values have been omitted for brevity and simplicity.

It will be observed that the multiplication is carried out in accordance with any one of three possible states for each digital place in the quotient. That is, the carry and sum may both be zero or both digits may be equal to one, or either digit may be equal to one but not both. This ternary decoding system therefore eliminates the need for assimilation and minimizes the time required for generation of a new remainder by avoiding the introduction of carry propagation delay.

While the invention has been particularly shown and described with reference to a preferred embodiment thereof, it will be understood by those skilled in the art that various changes in form and details may be made therein without departing from the spirit and scope of the invention.

We claim:

1. A digital division system for dividing a dividend by a divisor comprising:

table look-up means responsive to the divisor for generating a digital value M which, when multiplied against the divisor, provides a product approximating unity;

means coupled to the table look-up means and responsive to the value M, the divisor and the dividend for generating new divisor and new dividend values;

recirculating means coupled to the new divisor and new dividend value generating means and responsive to the new divisor and dividend values for initially utilizing the new dividend value as a remainder, and thereafter reducing the remainder through successive iterations, each iteration comprising the addition of a first portion of the previous remainder to the product of the new divisor value and a second portion of the previous remainder to form a new remainder; and means coupled to the recirculating means and responsive to the second portion of each remainder formed for providing a quotient value.

2. A digital division system for dividing a dividend by a divisor comprising:

means responsive to the value of the divisor for generating a selected factor which, when multiplied against the divisor, provides a new divisor value approximating unity;

multiplier means coupled to the means for generating and responsive to the divisor, the dividend and the selected factor for multiplying the divisor and dividend against the selected factor to provide new divisor and new dividend values; and means coupled to the multiplier means and responsive to the new divisor and new dividend values for successively generating new partial quotients and new remainder values in iterative fashion.

3. The invention as set forth in claim 2, wherein the means for successively generating new partial quotient values includes means responsive to each of a succession of new remainder values for selecting a predetermined number of higher order digits of each new remainder value as a new partial quotient.

4. The invention as set forth in claim 3 above, wherein said system in addition includes means coupled to the multiplier means and responsive to the new divisor value for generating a new small divisor, $-Y$, comprising the difference between the new divisor value and unity, wherein said new small divisor has a selected number of high order digits of zero value, and wherein said means for generating new partial quotients and new remainder values comprises second multiplier means coupled to the means for generating a new small divisor for providing the products of the new small divisor and the selected predetermined number of higher order digits of each new remainder value, and carry-save adder means coupled to the second multiplier means for combining the products with a predetermined number of lower order digits of each new remainder value to form the next new remainder value.

5. The invention as set forth in claim 4 above, wherein said system further includes quotient generating means including a pair of quotient registers, means coupled between the quotient registers and the carry-save adder means for inserting successive ones of the new partial quotients in selected positions in said quotient register means, and quotient adder means coupled to the quotient registers and responsive to the new partial quotients for generating a full quotient value.

6. The invention as set forth in claim 5 above, wherein said successive partial quotients are alternated between said registers in overlapping digital positions relative to the digital places in the full quotient value, and wherein said means for generating a selected factor comprises logic circuit table look-up circuits.

7. A digital division system responsive to divisor and dividend values to generate a quotient comprising:

divisor register means for presenting the divisor value;

dividend register means for presenting the dividend value;

table look-up logic circuits coupled to the divisor register means and responsive to the divisor value to provide a digital value M which, when multiplied against the divisor value, provides a new divisor value in a predetermined range approximating unity, said range being no greater than unity at one extreme and having a selected number N of high order fractional binary 1 digits at the other extreme;

first multiplier means coupled to the dividend register means and the table look-up logic circuits and responsive to the divisor and dividend values for generating the new divisor value, and a new dividend value, $R_0$;

subtraction circuit means coupled to the first multiplier means and responsive to the new divisor value for providing the difference, Y, between the new divisor value and unity as a new small divisor value;

new small divisor register means coupled to the subtraction circuit means for presenting the new small divisor value;

carry-save adder means including adder in gates coupled to the first multiplier means for providing the new dividend $R_0$ as an initial remainder value and thereafter successively adding partial products and low order digit values of prior remainder values to provide new remainder values;

carry-save register means coupled to the carry-save adder means for receiving the successive remainder values from said carry-save adder means;

quotient decoder means coupled to the carry-save register means for providing N high order digit values of each new remainder value;

second multiplier means coupled to the new small divisor register means, the quotient decoder means and the adder in gates for multiplying the new small divisor value by the N high order digit values of each new remainder value to provide the partial products to the carry-save adder means;

assimilator means coupled to the carry-save register means for assimilating N high order digit values of the successive remainder values;

means, including a pair of quotient registers coupled to the assimilator means, for storing the successively provided digit values from the assimilator means as successive partial quotients in overlapping positions relative to a total quotient position; and quotient adder means coupled to the pair of quotient registers for providing a total quotient output value.

8. A system for developing new remainders from prior remainders and a divisor value comprising:

means coupled to receive the prior remainders in carry-save form for generating shift control signals dependent on the relationship of carry and sum values thereof;

means coupled to receive the divisor value and to the shift control signal generating means to receive the shift control signals for generating partial products; and means coupled to receive the prior remainders and to the partial product generating means to receive the partial products for developing new remainders in carry-save form.

9. A binary digital system for developing new remainders from divisor values and prior remainders without carry propagation delay comprising:

carry-save adder circuits coupled to receive a portion of each prior remainder and a new partial product for providing a new remainder in carry-save form therefrom;

carry and sum register means coupled to said carry-save adder circuits for storing each new remainder;

means coupling the carry and sum register means to the carry-save adder circuits to provide a less significant digit portion of each new remainder to the carry-save adder circuits as said portion of each prior remainder;

quotient decoder circuits coupled to said carry and sum register means for deriving a more significant digit portion of each new remainder, said quotient decoder circuits generating shift control signals for the successive generation of the new partial products; and multiplier circuit means coupled to receive the divisor values, coupled to the quotient decoder circuits to receive the shift control signals, and coupled to the carry-save adder circuits for providing the new partial products to the carry-save adder circuits.